United States Patent
Liu

(10) Patent No.: US 10,558,447 B2
(45) Date of Patent: Feb. 11, 2020

(54) APPLICATION PUSH METHOD, AND A SERVICE DEVICE

(71) Applicant: BEIJING KINGSOFT INTERNET SECURITY SOFTWARE CO., LTD., Beijing (CN)

(72) Inventor: Haiwang Liu, Beijing (CN)

(73) Assignee: BEIJING KINGSOFT INTERNET SECURITY SOFTWARE CO., LTD, Beijing (CN)

( * ) Notice: Subject to any disclaimer, the term of this patent is extended or adjusted under 35 U.S.C. 154(b) by 18 days.

(21) Appl. No.: 15/752,378

(22) PCT Filed: Aug. 18, 2016

(86) PCT No.: PCT/CN2016/095895
§ 371 (c)(1),
(2) Date: Feb. 13, 2018

(87) PCT Pub. No.: WO2017/032265
PCT Pub. Date: Mar. 2, 2017

(65) Prior Publication Data
US 2019/0004781 A1   Jan. 3, 2019

(30) Foreign Application Priority Data
Aug. 25, 2015 (CN) .......................... 2015 1 0526407

(51) Int. Cl.
*G06F 9/445* (2018.01)
*G06F 8/61* (2018.01)
(Continued)

(52) U.S. Cl.
CPC ............ *G06F 8/61* (2013.01); *G06F 9/44505* (2013.01); *G06F 16/00* (2019.01); *H04L 67/26* (2013.01); *H04L 67/34* (2013.01)

(58) Field of Classification Search
CPC ........................................................ G06F 8/61
(Continued)

(56) References Cited

U.S. PATENT DOCUMENTS 7,003,767 B2 * 2/2006 Larkin ...................... G06F 8/65
717/172
7,035,630 B2 * 4/2006 Knowles ................. H04L 67/16
455/418

(Continued)

FOREIGN PATENT DOCUMENTS

CN      102665177      9/2012
CN      104035812      9/2014
(Continued)

OTHER PUBLICATIONS

English translation of the WO/ISR for PCT Application CN2016095895, Nov. 25, 2016.

*Primary Examiner* — Francisco J Aponte
(74) *Attorney, Agent, or Firm* — Hodgson Russ LLP

(57) ABSTRACT

Disclosed are an application push method and a server device. A set of target applications to be pushed is acquired, the target applications in the set of target applications to be pushed require a target terminal, to which the target applications are to be pushed, to at least have a target configuration parameter. A device configuration parameter of the target terminal is acquired. It is determined whether the device configuration parameter of the target terminal is matched with the target configuration parameter, and the target applications in the set of target applications to be pushed are pushed to the target terminal is performed if the device configuration parameter of the target terminal is matched with the target configuration parameter, otherwise, the procedure ends.

10 Claims, 4 Drawing Sheets

(51) Int. Cl.
  *G06F 16/00* (2019.01)
  *H04L 29/08* (2006.01)
(58) Field of Classification Search
  USPC .......................................................... 717/177
  See application file for complete search history.

(56) References Cited

U.S. PATENT DOCUMENTS

| | | | | |
|---|---|---|---|---|
| 7,055,148 B2* | 5/2006 | Marsh | ................ | G06F 8/65 713/2 |
| 7,069,581 B2* | 6/2006 | Fu | ................ | G06F 8/60 713/183 |
| 7,490,323 B2* | 2/2009 | D'Alo | ................ | G06F 11/3006 709/221 |
| 7,831,959 B1* | 11/2010 | Perry | ................ | G06F 9/44505 717/121 |
| 8,078,158 B2* | 12/2011 | Backholm | ................ | H04M 3/42178 455/419 |
| 8,190,715 B1* | 5/2012 | Narayanaswamy | ................ | G06F 8/61 709/220 |
| 8,370,800 B2* | 2/2013 | Burke | ................ | G06F 8/61 717/115 |
| 8,463,885 B2* | 6/2013 | DeHaan | ................ | G06F 8/61 709/220 |
| 8,584,119 B2* | 11/2013 | Ellington | ................ | G06F 8/71 717/174 |
| 8,601,170 B1* | 12/2013 | Marr | ................ | G06F 21/572 710/15 |
| 8,805,972 B1* | 8/2014 | Merkulov | ................ | G06F 21/604 709/220 |
| 8,839,234 B1* | 9/2014 | Voronkov | ................ | G06F 8/61 717/172 |
| 8,887,144 B1* | 11/2014 | Marr | ................ | G06F 8/65 717/168 |
| 8,914,794 B2* | 12/2014 | Bliss | ................ | G06F 8/63 717/101 |
| 8,958,780 B2* | 2/2015 | Smith | ................ | H04W 8/24 455/414.3 |
| 9,134,993 B2* | 9/2015 | Miyama | ................ | G06F 16/27 |
| 9,164,747 B2* | 10/2015 | Ono | ................ | G06F 8/61 |
| 9,244,671 B2* | 1/2016 | Voronkov | ................ | G06F 8/63 |
| 9,317,269 B2* | 4/2016 | Kimmet | ................ | G06F 8/65 |
| 9,569,205 B1* | 2/2017 | McCorkendale | ................ | G06F 8/71 |
| 9,684,499 B2* | 6/2017 | Mody | ................ | G06F 8/61 |
| 9,830,169 B2* | 11/2017 | Chakrabarti | ................ | G06F 9/445 |
| 2005/0289538 A1* | 12/2005 | Black-Ziegelbein | ................ | G06F 8/61 717/177 |
| 2006/0039561 A1* | 2/2006 | Ypya | ................ | H04L 41/0253 380/270 |
| 2006/0106806 A1* | 5/2006 | Sperling | ................ | G06F 8/65 |
| 2006/0179432 A1* | 8/2006 | Walinga | ................ | H04L 41/0806 717/171 |
| 2007/0093243 A1* | 4/2007 | Kapadekar | ................ | H04M 3/42178 455/419 |
| 2008/0040455 A1* | 2/2008 | MacLeod | ................ | G06F 8/61 709/220 |
| 2008/0127179 A1* | 5/2008 | Moss | ................ | G06F 8/61 717/175 |
| 2009/0228868 A1* | 9/2009 | Drukman | ................ | G06F 9/44505 717/121 |
| 2010/0031247 A1* | 2/2010 | Arnold | ................ | G06F 8/61 717/174 |
| 2010/0131625 A1* | 5/2010 | Dehaan | ................ | H04L 41/0846 709/221 |
| 2010/0262958 A1* | 10/2010 | Clinton | ................ | G06F 8/65 717/171 |
| 2010/0325624 A1* | 12/2010 | Bartolo | ................ | G06F 8/61 717/176 |
| 2011/0087763 A1* | 4/2011 | George | ................ | H04W 24/08 709/223 |
| 2013/0067461 A1* | 3/2013 | Taragin | ................ | G06F 8/61 717/176 |
| 2013/0290898 A1* | 10/2013 | Lu | ................ | G06F 3/0481 715/808 |
| 2013/0326502 A1* | 12/2013 | Brunsman | ................ | G06F 8/61 717/178 |
| 2014/0006434 A1 | 1/2014 | Chervirala et al. | | |
| 2014/0026131 A1* | 1/2014 | Ravi | ................ | G06F 8/60 717/177 |
| 2014/0047429 A1* | 2/2014 | Gaither | ................ | G06F 8/60 717/170 |
| 2014/0123129 A1* | 5/2014 | Risbood | ................ | G06F 9/44505 717/176 |
| 2014/0208088 A1* | 7/2014 | Somani | ................ | G06F 8/65 713/1 |
| 2015/0347122 A1* | 12/2015 | Wang | ................ | G06F 8/65 717/172 |
| 2016/0173331 A1* | 6/2016 | Janke | ................ | H04L 67/2823 709/221 |
| 2018/0063700 A1* | 3/2018 | Chandrasekaran | ... | H04W 8/205 |

FOREIGN PATENT DOCUMENTS

| | | |
|---|---|---|
| CN | 104090807 | 10/2014 |
| CN | 104216998 | 12/2014 |
| CN | 104679852 | 6/2015 |
| CN | 104794115 | 7/2015 |
| CN | 105117464 | 12/2015 |

* cited by examiner

APPLICATION PUSH METHOD, AND A SERVICE DEVICE

CROSS REFERENCE TO RELATED APPLICATION

This application is a U.S. national phase application of International Application PCT/CN2016/095895, filed on Aug. 18, 2016, which claims priority to and benefits of Chinese Patent Application Serial No. 201510526407.2, filed with the State Intellectual Property Office of P. R. China on Aug. 25, 2015, the entire contents of which are incorporated herein by reference.

FIELD

The present disclosure relates to the internet technology field, and more particularly to an application push method and a service device.

BACKGROUND

Currently, with the development of internet technology, a variety of applications provided on terminals, such as a smartphone, a tablet PC and other portable devices, may be used in one's life, work and entertainment. In order to recommend a user a most likely needed application, an application which has a largest installation number or is used by most users is commonly pushed to a user terminal.

However, in practice, it has been found that the application determined as above may have a high requirement for device parameters such as a memory size or a screen resolution of a terminal. When the terminal cannot meet the device parameters required by the application, installation or operation experience of the application may be affected, thus reducing a matching degree between the pushed application and the terminal.

SUMMARY

Embodiments of the present disclosure provide an application push method and a service device, thus subjecting pushed application to be better matched with the terminal.

In embodiments of a first aspect of the present disclosure, the application push method is provided, including:

acquiring a set of target applications to be pushed, in which the target applications require a target terminal, to which the target applications are to be pushed, to at least have a target configuration parameter;

acquiring a device configuration parameter of the target terminal;

determining whether the device configuration parameter of the target terminal is matched with the target configuration parameter, and pushing the target applications in the set of target applications to be pushed to the target terminal if the device configuration parameter of the target terminal is matched with the target configuration parameter.

In an embodiment of the present disclosure, acquiring a set of target applications to be pushed includes:

determining a set of applications to be pushed according to an application push rule;

determining the set of target applications to be pushed from the set of applications to be pushed according to attribute information of each application in the set of applications to be pushed, the set of target applications to be pushed being a subset of the set of applications to be pushed;

determining the target configuration parameter at least required for the target terminal to install the target applications in the set of target applications to be pushed, according to device configuration parameters of terminals each installed with any application in the set of target applications to be pushed.

In an embodiment of the present disclosure, determining the set of target applications to be pushed from the set of applications to be pushed according to attribute information of each application in the set of applications to be pushed includes:

acquiring applications having an installation package size greater than a predetermined threshold from the set of applications to be pushed, the acquired applications constituting an application subset;

acquiring a ratio of the number of terminals installed with the applications in the application subset to the number of terminals installed with the applications in the set of applications to be pushed;

determining that the application subset is the set of target applications to be pushed if the ratio is smaller than a predetermined ratio.

In an embodiment of the present disclosure, determining the target configuration parameter at least required for the target terminal to install the target application in the set of target applications to be pushed according to device configuration parameters of terminals each installed with any application in the set of target applications to be pushed includes:

acquiring the device configuration parameters of the terminals each installed with any application in the set of target applications to be pushed, in which the device configuration parameter includes at least one of an operation system, a type, a screen resolution and a memory size;

determining a common device configuration parameter from the device configuration parameters of the terminals each installed with any application in the set of target applications to be pushed;

determining the target configuration parameter at least required for the target terminal to install the target applications in the set of target applications to be pushed, according to the common device configuration parameter.

In an embodiment of the present disclosure, the method further includes:

filtering the applications in the set of target applications to be pushed out from the set of applications to be pushed to acquire an application push subset, if it is determined that the device configuration parameter of the target terminal is not matched with the target configuration parameter; and pushing applications in the application push subset to the target terminal.

Accordingly, in embodiments of a second aspect of the present disclosure, the service device is provided, including a processor, a memory, an communication interface and a communication bus, in which the memory is configured to store an executable program code, the processor is configured to run a program corresponding to the executable program code by reading the executable program code stored in the memory to perform the application push method described above.

In embodiments of the present disclosure, a computer readable storage medium is provided, having stored therein instructions that, when executed by a processor of a device, causes the device to perform the application push method described above.

BRIEF DESCRIPTION OF THE DRAWINGS

In order to more clearly illustrate the technical solutions in embodiments of the present disclosure, drawings intended to be used in the embodiments are briefly described below. It will be apparent that the drawings in the following description are merely exemplary embodiments of the present invention. Those skilled in the art will be able to obtain additional drawings in accordance with these drawings without any inventive work.

DETAILED DESCRIPTION

Embodiments of the present disclosure will be described in details in the following with reference to drawings, and it will be apparent that the described embodiments are only part of the embodiments of the present disclosure. All other embodiments which can be obtained by those skilled in the art without any inventive work based on embodiments described in the present disclosure are within the scope of the present disclosure.

In the following, an application push method, an application push apparatus and a terminal are provided according to embodiments of the present disclosure, which subject pushed application to be better matched with a terminal.

Figure 1:
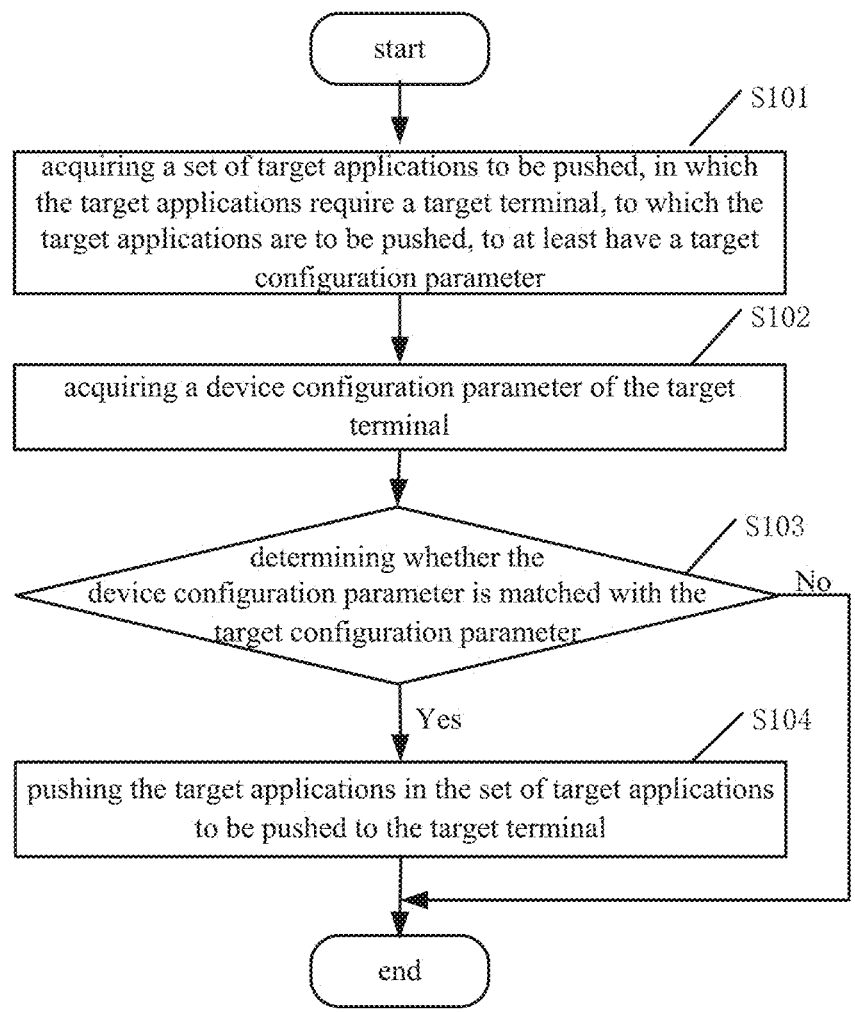
FIG. 1 is a flow chart of an application push method according to an embodiment of the present disclosure.

FIG. 1 is a flow chart of an application push method according to an embodiment of the present disclosure. As shown in FIG. 1, the application push method may include following steps.

S101, a set of target applications to be pushed is acquired, the target applications in the set of target applications to be pushed require a target terminal, to which the target applications are to be pushed, to at least have a target configuration parameter.

S102, a device configuration parameter of the target terminal is acquired.

S103, it is determined whether the device configuration parameter of the target terminal is matched with the target configuration parameter, and S104 is performed if the device configuration parameter of the target terminal is matched with the target configuration parameter, otherwise, the procedure ends.

S104, the target applications in the set of target applications to be pushed are pushed to the target terminal.

In an embodiment of the present disclosure, S101 of acquiring a set of target applications to be pushed may include:

1) determining a set of applications to be pushed according to an application push rule;

2) determining the set of target applications to be pushed from the set of applications to be pushed according to attribute information of each application in the set of applications to be pushed, the set of target applications to be pushed being a subset of the set of applications to be pushed;

3) determining the target configuration parameter at least required for the target terminal to install the target applications in the set of target applications to be pushed, according to device configuration parameters of terminals each installed with any application in the set of target applications to be pushed.

According to embodiments of the present disclosure, the set of applications to be pushed may be determined based on one of application push rules, such as the number of terminals installed with an application, a speed of an increase of the number of terminals installed with the application, and the number of terminals using the application, or based on operation information of the target terminal.

In an embodiment of the present disclosure, the attribute information of the application may include a size of an installation package, a requirement for memory to install the application and a requirement for screen resolution when the application is running.

In an embodiment of the present disclosure, the step 2) of determining the set of target applications to be pushed from the set of applications to be pushed according to attribute information of each application in the set of applications to be pushed may specifically be performed as follows:

21) acquiring applications having an installation package size greater than a predetermined threshold from the set of applications to be pushed, and the acquired applications constituting an application subset;

22) acquiring a ratio of the number of terminals installed with the applications in the application subset to the number of terminals installed with the applications in the set of applications to be pushed;

23) determining that the application subset is the set of target applications to be pushed if the ratio is smaller than a predetermined ratio.

In an embodiment of the present disclosure, step 21) may be replaced by a step of acquiring applications by which the memory size occupied is greater than a predetermined threshold from the set of applications to be pushed, and the acquired applications constitute an application subset. Specifically, the number of the applications included in the application subset will change if the predetermined threshold is changed, and accordingly, the ratio of the number of terminals installed with the applications in the application subset to the number of terminals installed with the applications in the set of applications to be pushed may also change. In order to reduce influence on the target terminal or user experience by not pushing the set of target applications to the target terminal when the device configuration parameter of the target terminal is not matched with the target configuration parameter, here, the predetermined ratio is configured to ensure the ratio of the number of terminals installed with the applications in the application subset to the number of terminals installed with the applications in the set of applications to be pushed not to be over high, and the predetermined threshold is configured to make the attribute information of the applications in the application subset to be special, such as an oversized installation package or an overlarge memory size, such that most terminals cannot meet the requirements.

In an embodiment of the present disclosure, the step 3) of determining the target configuration parameter at least required for the target terminal to install the target applications in the set of target applications to be pushed, according to device configuration parameters of terminals each installed with any application in the set of target applications to be pushed may specifically be performed as follows:

31) acquiring the device configuration parameters of the terminals each installed with any application in the set of target applications to be pushed, where the device configuration parameter includes at least one of an operation system, a type, a screen resolution and a memory size;

32) determining a common device configuration parameter from the device configuration parameters of terminals each installed with any application in the set of target applications to be pushed;

33) determining the target configuration parameter at least required for the target terminal to install the target applications in the set of target applications to be pushed, according to the common device configuration parameter.

For example, the target configuration parameter may be a minimum size of memory, a minimum size of screen resolution and the like, such that the target application pushed according to the target configuration parameter is matched with the target terminal. For example, a game meeting above target configuration parameter may better run on the target terminal.

According to the application push method illustrated in FIG. 1, the set of target applications to be pushed is acquired, the target applications in the set of target applications to be pushed require a target terminal, to which the target applications are to be pushed, to at least have a target configuration parameter. The device configuration parameter of the target terminal is acquired. It is determined whether the device configuration parameter of the target terminal is matched with the target configuration parameter, and the target applications in the set of target applications to be pushed are pushed to the target terminal if the device configuration parameter of the target terminal is matched with the target configuration parameter. Therefore, in the embodiments of the present disclosure, it is possible to determine whether to push the target applications in the set of the target applications to the target terminal according to the device configuration parameter of the target application, thus improving a matching degree between the pushed application and the target terminal.

Figure 2:
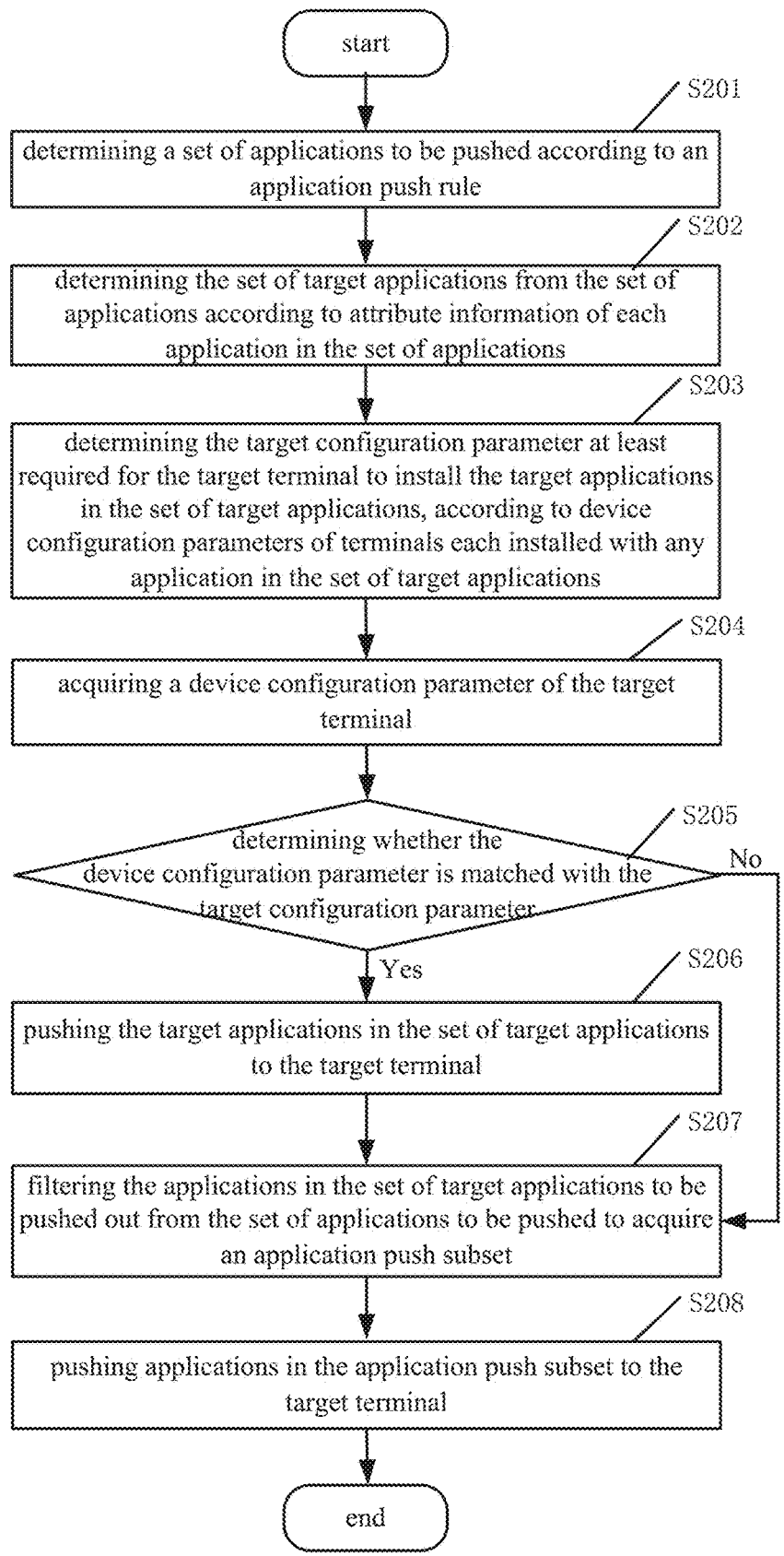
FIG. 2 is a flow chart of another application push method according to an embodiment of the present disclosure.

FIG. 2 is a flow chart of another application push method according to an embodiment of the present disclosure. As shown in FIG. 2, the application push method may include following steps.

S201, it is determined that a set of applications to be pushed according to an application push rule.

For example, the step of determining the set of applications to be pushed according to the application push rule may be performed as follows. Historical running information of a terminal is acquired. A push scenario and an application to be pushed in the push scenario are determined according to the historical running information. It is detected whether the target terminal is in the push scenario. If the target terminal is in the push scenario, the applications to be pushed form a set of applications to be pushed.

S202, the set of target applications is determined from the set of applications according to attribute information of each application in the set of applications, and the set of target applications is a subset of the set of applications.

S203, the target configuration parameter at least required for the target terminal to install the target applications in the set of target applications is determined, according to device configuration parameters of terminals each installed with any application in the set of target applications.

In an embodiment of the present disclosure, specific embodiments of S202 and S203 may be referred to above related description, which are not described in detail here. Specifically, before S202, the attribute information of each application in the set of applications is required to be acquired, and a method for acquiring such information may be that the attribute information of each application is acquired automatically by a crawler and further stored in a predetermined database. The applications may be classified into a plurality of subsets of applications according to the attribute information of each application in the set of applications. For example, the applications may be classified into three subsets according to memory sizes needed by the applications, that is a subset of applications with a required memory size of 0 to 50 M, a subset of applications with a required memory size of 50 to 100 M, and a subset of applications with a required memory size greater than 100 M. The ratio of terminals installed with applications in one of the three subsets to the total terminals installed with the applications in the set of applications is 30%, 60% or 10%, respectively. If one of the ratios is smaller than a predetermined ratio 20%, it can be determined that the subset of applications with a required memory size greater than 100 M is the set of target applications. Therefore, when the device configuration parameter of the target terminal is not matched with the target configuration parameter, the set of the target applications will not be pushed to the target terminal, thus reducing influence on the target terminal or user experience.

S204, a device configuration parameter of the target terminal is acquired.

S205, it is determined whether the device configuration parameter of the target terminal is matched with the target configuration parameter. If the device configuration parameter of the target terminal is matched with the target configuration parameter, S206 is performed. If the device configuration parameter of the target terminal is not matched with the target configuration parameter, S207 and S208 are performed.

S206, the target applications in the set of target applications are pushed to the target terminal.

S207, the application in the set of target applications is filtered from the set of applications to acquire an application push subset.

S208, applications in the application push subset are pushed to the target terminal.

In an embodiment of the present invention, it is also possible to acquire a current network state of the target terminal, and if the current network state is a predetermined network state, S206 or S208 is executed. Specifically, the predetermined network state may be configured to indicate a network with unlimited network traffic or a network with a high security level, thus avoiding a case that a pushed application cannot be received by the target terminal when the network traffic is limited or ensuring safety of the target terminal.

In an embodiment of the present invention, in S201 to S206, the target application of the set of the target applications, which is matched with the device configuration parameter of the target terminal, may be pushed to the target terminal, thus improving a matching degree between the pushed application and the target terminal. In S207 and S208, the target application of the set of the target applications which is not matched with the target terminal may be filtered out from the set of applications, such that the matching degree between the pushed application and the target terminal may also be improved.

According to the application push method illustrated in FIG. 2, a set of applications to be pushed is determined according to an application push rule. The set of target applications is determined from the set of applications according to attribute information of each application in the set of applications, and the set of target applications is a subset of the set of applications. The target configuration parameter at least required for the target terminal to install the target applications in the set of target applications is determined, according to device configuration parameters of terminals each installed with any application in the set of target applications. The device configuration parameter of the target terminal is acquired. It is determined whether the device configuration parameter of the target terminal is matched with the target configuration parameter. If the device configuration parameter of the target terminal is matched with the target configuration parameter, the target applications in the set of target applications are pushed to the target terminal. If the device configuration parameter of the target terminal is not matched with the target configuration parameter, the applications in the set of target applications are filtered out from the set of applications to acquire an application push subset, and applications in the application push subset are pushed to the target terminal. Therefore, the matching degree between the pushed application and the target terminal may be improved according to the application push method illustrated in FIG. 2.

Figure 3:
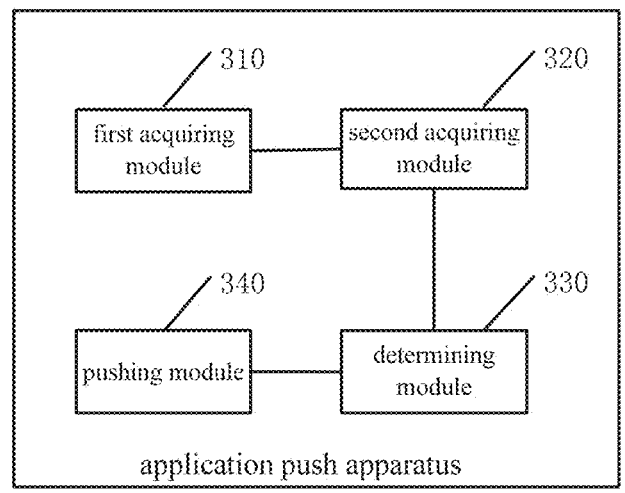
FIG. 3 is a schematic diagram showing an application push apparatus according to an embodiment of the present disclosure.

FIG. 3 is a schematic view showing an application push apparatus according to an embodiment of the present disclosure. As shown in FIG. 3, the application push apparatus may include a first acquiring module 310, a second acquiring module 320, a determining module 330 and a pushing module 340.

Specifically, the first acquiring module 310 is configured to acquire a set of target applications to be pushed, in which the target applications require a target terminal, to which the target applications are to be pushed, to at least have a target configuration parameter.

The second acquiring module 320 is configured to acquire a device configuration parameter of the target terminal.

The determining module 330 is configured to determine whether the device configuration parameter of the target terminal is matched with the target configuration parameter.

The pushing module 340 is configured to push the target applications in the set of target applications to be pushed to the target terminal if it is determined by the determining module 330 that the device configuration parameter of the target terminal is matched with the target configuration parameter.

Figure 4:
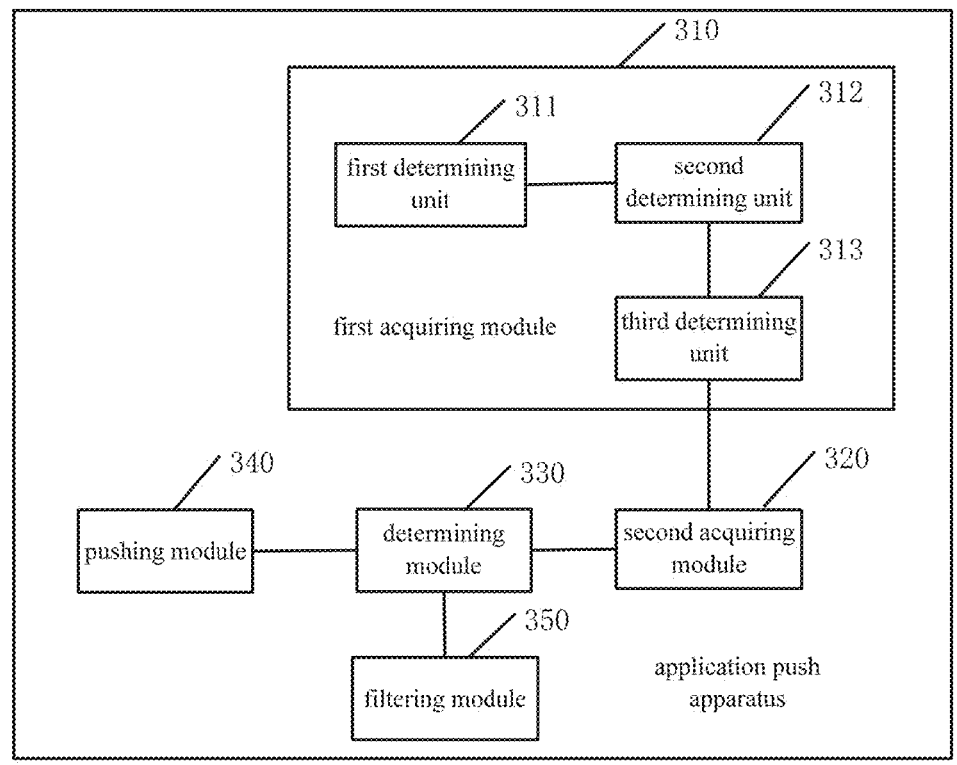
FIG. 4 is a schematic diagram showing another application push apparatus according to an embodiment of the present disclosure.

FIG. 4 is a schematic view showing another application push apparatus according to an embodiment of the present disclosure. Specifically, FIG. 4 shows an application push apparatus which is an alternative of the one shown in FIG. 3. Compared to the application push apparatus shown in FIG. 3, the application push apparatus shown in FIG. 4 may further include a filtering module 350.

In an embodiment of the present disclosure, the first acquiring module 310 shown in FIG. 4 may include a first determining unit 311, a second determining unit 312 and a third determining unit 313.

The first determining unit 311 is configured to determine a set of applications to be pushed according to an application push rule.

The second determining unit 312 is configured to determine the set of target applications to be pushed from the set of applications to be pushed according to attribute information of each application in the set of applications to be pushed, and the set of target applications to be pushed is a subset of the set of applications to be pushed.

The third determining unit 313 is configured to determine the target configuration parameter at least required for the target terminal to install the target applications in the set of target applications to be pushed, according to device configuration parameters of terminals each installed with any application in the set of target applications to be pushed.

According to embodiments of the present disclosure, the set of applications to be pushed may be determined based on one of application push rules, such as the number of terminals installed with an application, a speed of an increase of the number of terminals installed with the application, and the number of terminals using the application, or based on operation information of the target terminal. For example, the step of determining the set of applications to be pushed according to the application push rule may be performed as follows. Historical running information of a terminal is acquired. A push scenario and an application to be pushed in the push scenario are determined according to the historical running information. It is detected whether the target terminal is in the push scenario. If the target terminal is in the push scenario, the applications to be pushed form a set of applications to be pushed.

In an embodiment of the present disclosure, the attribute information of the application may include a size of an installation package, a requirement for memory to install the application and a requirement for screen resolution when the application is running.

In an embodiment of the present disclosure, the second determining unit 312 may be specifically configured to acquire applications having an installation package size greater than a predetermined threshold from the set of applications to be pushed, and the acquired applications constituting an application subset; acquire a ratio of the number of terminals installed with the applications in the application subset to the number of terminals installed with the applications in the set of applications to be pushed; and determine that the application subset is the set of target applications to be pushed if the ratio is smaller than a predetermined ratio. Instead, application whose memory size is greater than a predetermined threshold may be acquired from the set of applications, such that an application subset consisting of the acquired applications is acquired. Specifically, the number of the applications included in the application subset will change if the predetermined threshold is changed, and accordingly, the ratio of the number of terminals installed with the applications in the application subset to the number of terminals installed with the applications in the set of applications to be pushed may also change. In order to reduce influence on the target terminal or user experience by not pushing the set of target applications to the target terminal when the device configuration parameter of the target terminal is not matched with the target configuration parameter, here, the predetermined ratio is configured to ensure the ratio of the number of terminals installed with the applications in the application subset to the number of terminals installed with the applications in the set of applications to be pushed not to be over high, and the predetermined threshold is configured to make the attribute information of the applications in the application subset to be special, such as an oversized installation package or an overlarge memory size, such that most terminals cannot meet the requirements.

For example, the applications may be classified into three subsets according to memory sizes needed by the applications, that is a subset of applications with a required memory size of 0 to 50 M, a subset of applications with a required memory size of 50 to 100 M, and a subset of applications with a required memory size greater than 100 M. The ratio of terminals installed with applications in one of the three subsets to the total terminals installed with the applications in the set of applications is 30%, 60% and 10% respectively. If one of the ratios is smaller than a predetermined ratio 20%, it can be determined that the subset of applications with a required memory size greater than 100 M is the set of target applications. Therefore, when the device configuration parameter of the target terminal is not matched with the target configuration parameter, the set of the target applications will not be pushed to the target terminal, thus reducing influence on the target terminal or user experience.

In an embodiment of the present disclosure, the third determining unit 313 is specifically configured to: acquire the device configuration parameters of the terminals each installed with any application in the set of target applications to be pushed, where the device configuration parameter include at least one of an operation system, a type, a screen resolution and a memory size; determine a common device configuration parameter from the device configuration parameters of terminals each installed with any application in the set of target applications to be pushed; determine the target configuration parameter at least required for the target terminal to install the target applications in the set of target applications to be pushed, according to the common device configuration parameter. For example, the target configuration parameter may be a minimum size of memory, a minimum size of screen resolution and the like, such that the target application pushed according to the target configuration parameter is matched with the target terminal. For example, a game meeting above target configuration parameter may better run on the target terminal.

The filtering module 350 is configured to filter the application in the set of target applications to be pushed out from the set of applications to be pushed to acquire an application push subset if it is determined by the determining module 330 that the device configuration parameter of the target terminal is not matched with the target configuration parameter.

The pushing module 340 is further configured to push applications in the application push subset acquired by the filtering module 350 to the target terminal.

In an embodiment of the present invention, it is also possible to acquire a current network state of the target terminal, and if the current network state is a predetermined network state, a corresponding application is pushed by the pushing module 340. Specifically, the predetermined network state may be configured to indicate a network with unlimited network traffic or a network with a high security level, thus avoiding a case that a pushed application cannot be received by the target terminal when the network traffic is limited or ensuring safety of the target terminal.

In an embodiment of the present invention, the target application of the set of the target applications, which is matched with the device configuration parameter of the target terminal, may be pushed to the target terminal by the determining module and the pushing module, thus improving a matching degree between the pushed application and the target terminal. The target application of the set of the target applications which is not matched with the target terminal may be filtered out from the set of applications by the filtering module and the pushing module, such that the matching degree between the pushed application and the target terminal may also be improved.

In the application push apparatuses shown in FIG. 3 and FIG. 4, the set of target applications to be pushed is acquired by the first acquiring module, the target applications in the set of target applications require a target terminal, to which the target applications are to be pushed, to at least have a target configuration parameter. The device configuration parameter of the target terminal is acquired by the second acquiring module. It is determined by the determining module whether the device configuration parameter of the target terminal is matched with the target configuration parameter. If it is determined by the determining module that the device configuration parameter of the target terminal is matched with the target configuration parameter, the target applications in the set of target applications are pushed to the target terminal by the pushing module. Therefore, according to the application push apparatuses described in FIG. 3 or FIG. 4, it is possible to determine whether to push the target applications in the set of the target applications to the target terminal according to the device configuration parameter of the target application, thus improving a matching degree between the pushed application and the target terminal. Moreover, according to the application push apparatus described in FIG. 4, the filtering module is used to filter the application in the set of target applications out from the set of applications to acquire an application push subset if it is determined by the determining module that the device configuration parameter of the target terminal is not matched with the target configuration parameter, and the pushing module is used to push applications in the application push subset to the target terminal. Therefore, the matching degree between the pushed application and the target terminal may also be improved according to the application push apparatus illustrated in FIG. 4.

Figure 5:
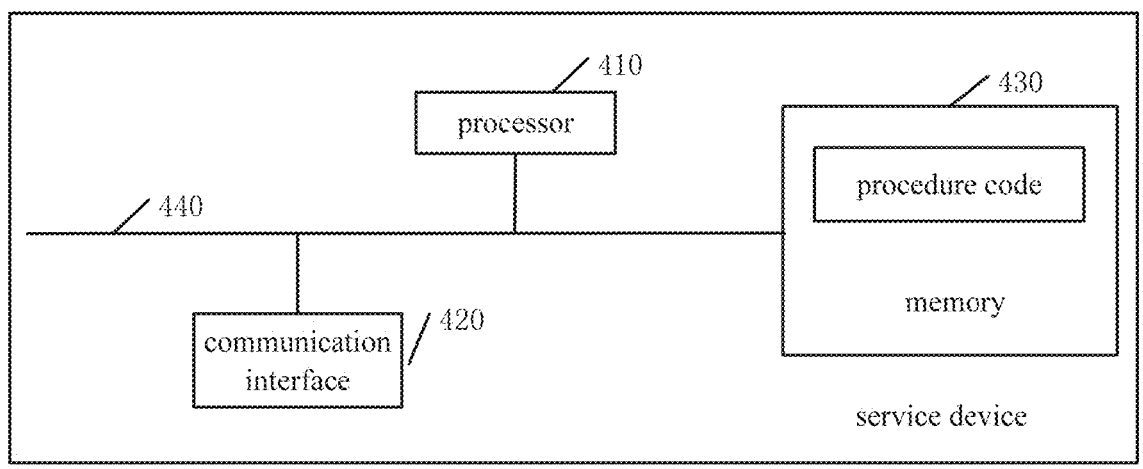
FIG. 5 is a schematic diagram showing a service device according to an embodiment of the present disclosure.

FIG. 5 is a schematic view showing a service device according to an embodiment of the present disclosure. As shown in FIG. 5, the service device may include a processor 410, a communication interface 420, a memory 430 and a communication bus 440. Specifically, the communication bus 440 is configured to realise communications among the components. The memory 430 may be a high-speed random-access memory (RAM), or a non-volatile memory, such as at least one disk memory. Alternatively, the memory 430 may be at least one memory located far from the processor 410. Specifically, the processor 410 is configured to combine the application push apparatuses shown in FIG. 3 or FIG. 4. A set of program codes is stored in the memory 430, and the set of program codes in the memory 430 is called by the processor 410 to perform following operations:

acquiring a set of target applications to be pushed, in which the target applications require a target terminal, to which the target applications are to be pushed, to at least have a target configuration parameter;

acquiring a device configuration parameter of the target terminal;

determining whether the device configuration parameter of the target terminal is matched with the target configuration parameter, and pushing the target applications in the set of target applications to be pushed to the target terminal if the device configuration parameter of the target terminal is matched with the target configuration parameter.

In an embodiment of the present disclosure, program codes in the memory 430 is called by the processor 410, acquiring a set of target applications to be pushed may be executed as following operations:

determining a set of applications to be pushed according to an application push rule;

determining the set of target applications to be pushed from the set of applications to be pushed according to attribute information of each application in the set of applications to be pushed, the set of target applications to be pushed being a subset of the set of applications to be pushed;

determining the target configuration parameter at least required for the target terminal to install the target applications in the set of target applications to be pushed, according to device configuration parameters of terminals each installed with any application in the set of target applications to be pushed.

In an embodiment of the present disclosure, the attribute information of the application may include a size of an installation package, a requirement for memory to install the application and a requirement for screen resolution when the application is running.

According to embodiments of the present disclosure, the set of applications to be pushed may be determined based on one of application push rules, such as the number of terminals installed with an application, a speed of an increase of the number of terminals installed with the application, and the number of terminals using the application, or based on operation information of the target terminal. For example, the step of determining the set of applications to be pushed according to the application push rule may be performed as follows. Historical running information of a terminal is acquired. A push scenario and an application to be pushed in the push scenario are determined according to the historical running information. It is detected whether the target terminal is in the push scenario. If the target terminal is in the push scenario, the applications to be pushed form a set of applications to be pushed.

In an embodiment of the present disclosure, the set of program codes in the memory 430 is called by the processor 410, determining the set of target applications to be pushed from the set of applications to be pushed according to attribute information of each application in the set of applications to be pushed may be executed as following operations:

acquiring applications having an installation package size greater than a predetermined threshold from the set of applications to be pushed, and the acquired applications constituting an application subset;

acquiring a ratio of the number of terminals installed with the applications in the application subset to the number of terminals installed with the applications in the set of applications to be pushed;

determining that the application subset is the set of target applications to be pushed if the ratio is smaller than a predetermined ratio.

Specifically, the number of the applications included in the application subset will change if the predetermined threshold is changed, and accordingly, the ratio of the number of terminals installed with the applications in the application subset to the number of terminals installed with the applications in the set of applications to be pushed may also change. In order to reduce influence on the target terminal or user experience by not pushing the set of target applications to the target terminal when the device configuration parameter of the target terminal is not matched with the target configuration parameter, here, the predetermined ratio is configured to ensure the ratio of the number of terminals installed with the applications in the application subset to the number of terminals installed with the applications in the set of applications to be pushed not to be over high, and the predetermined threshold is configured to make the attribute information of the applications in the application subset to be special, such as an oversized installation package or an overlarge memory size, such that most terminals cannot meet the requirements.

For example, the applications may be classified into three subsets according to memory sizes needed by the applications, that is a subset of applications with a required memory size of 0 to 50 M, a subset of applications with a required memory size of 50 to 100 M, and a subset of applications with a required memory size greater than 100 M. The ratio of terminals installed with applications in one of the three subsets to the total terminals installed with the applications in the set of applications is 30%, 60% and 10%, respectively. If one of the ratios is smaller than a predetermined ratio 20%, it can be determined that the subset of applications with a required memory size greater than 100 M is the set of target applications. Therefore, when the device configuration parameter of the target terminal is not matched with the target configuration parameter, the set of the target applications will not be pushed to the target terminal, thus reducing influence on the target terminal or user experience.

In an embodiment of the present disclosure, the set of program codes in the memory 430 is called by the processor 410, determining the target configuration parameter at least required for the target terminal to install the target application in the set of target applications to be pushed, according to device configuration parameters of terminals each installed with any application in the set of target applications to be pushed may be executed as following operations:

acquiring the device configuration parameters of the terminals each installed with any application in the set of target applications to be pushed, where the device configuration parameter includes at least one of an operation system, a type, a screen resolution and a memory size;

determining a common device configuration parameter from the device configuration parameters of terminals each installed with any application in the set of target applications to be pushed;

determining the target configuration parameter at least required for the target terminal to install the target applications in the set of target applications to be pushed, according to the common device configuration parameter.

For example, the target configuration parameter may be a minimum size of memory, a minimum size of screen resolution and the like, such that the target application pushed according to the target configuration parameter is matched with the target terminal. For example, a game meeting above target configuration parameter may better run on the target terminal.

In an embodiment of the present disclosure, the set of program codes in the memory 430 is called by the processor 410 to further execute following operations:

filtering the application in the set of target applications to be pushed out from the set of applications to be pushed to acquire an application push subset if it is determined that the device configuration parameter of the target terminal is not matched with the target configuration parameter;

pushing applications in the application push subset to the target terminal.

In an embodiment of the present invention, it is also possible to acquire a current network state of the target terminal, and if the current network state is a predetermined network state, a corresponding application is pushed by the processor 410. Specifically, the predetermined network state may be configured to indicate a network with unlimited network traffic or a network with a high security level, thus avoiding a case that a pushed application cannot be received by the target terminal when the network traffic is limited or ensuring safety of the target terminal.

In an embodiment of the present invention, the target application of the set of the target applications, which is matched with the device configuration parameter of the target terminal, may be pushed to the target terminal by the processor 410, thus improving a matching degree between the pushed application and the target terminal. The target application of the set of the target applications which is not matched with the target terminal may be filtered out from the set of applications by the processor 410, such that the matching degree between the pushed application and the target terminal may also be improved.

In addition, a computer readable storage medium is provided according to an embodiment of the present dislcosure. Specifically, the storage medium has stored therein instructions that, when executed by a processor of a device, causes the device to perform an application push method according to any one of embodiments of the present disclosure. Specifically, the application push method provided by the embodiments of the present disclosure may include:

acquiring a set of target applications to be pushed, in which the target applications require a target terminal, to which the target applications are to be pushed, to at least have a target configuration parameter;

acquiring a device configuration parameter of the target terminal;

determining whether the device configuration parameter of the target terminal is matched with the target configuration parameter, and pushing the target applications in the set of target applications to be pushed to the target terminal if the device configuration parameter of the target terminal is matched with the target configuration parameter.

In addition, a computer program is provided according to embodiments of the present disclosure, which when running on a processor, performs an application push method according to an embodiment of the present disclosure. Specifically, the application push method provided by the embodiments of the present disclosure may include:

acquiring a set of target applications to be pushed, in which the target applications require a target terminal, to which the target applications are to be pushed, to at least have a target configuration parameter;

acquiring a device configuration parameter of the target terminal;

determining whether the device configuration parameter of the target terminal is matched with the target configuration parameter, and pushing the target applications in the set of target applications to be pushed to the target terminal if the device configuration parameter of the target terminal is matched with the target configuration parameter.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In the description of the present disclosure, terms such as "first" and "second" are used herein for purposes of description and are not intended to indicate or imply relative importance or significance. Furthermore, in the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not follow a shown or discussed order according to the related functions in a substantially simultaneous manner or in a reverse order, to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An application push method, comprising:
   acquiring a set of target applications to be pushed, in which the target applications require a target terminal, to which the target applications are to be pushed, to at least have a target configuration parameter;
   acquiring a device configuration parameter of the target terminal; and
   determining whether the device configuration parameter of the target terminal is matched with the target configuration parameter, and pushing the target applications in the set of target applications to be pushed to the target terminal if the device configuration parameter of the target terminal is matched with the target configuration parameter;
   wherein acquiring a set of target applications to be pushed comprises:
      determining a set of applications to be pushed according to an application push rule;
      determining the set of target applications to be pushed from the set of applications to be pushed according to attribute information of each application in the set of applications to be pushed, the set of target applications to be pushed being a subset of the set of applications to be pushed;
      determining the target configuration parameter at least required for the target terminal to install the target applications in the set of target applications to be pushed, according to device configuration parameters of terminals each installed with any application in the set of target applications to be pushed;
   wherein determining the set of target applications to be pushed from the set of applications to be pushed according to attribute information of each application in the set of applications to be pushed comprises:
      acquiring applications having an installation package size greater than a predetermined threshold from the set of applications to be pushed, the acquired applications constituting an application subset;
      acquiring a ratio of the number of terminals installed with the applications in the application subset to the number of terminals installed with the applications in the set of applications to be pushed;
      determining that the application subset is the set of target applications to be pushed if the ratio is smaller than a predetermined ratio.

2. The method according to claim 1, wherein determining the target configuration parameter at least required for the target terminal to install the target application in the set of target applications to be pushed, according to device configuration parameters of terminals each installed with any application in the set of target applications to be pushed comprises:
   acquiring the device configuration parameters of the terminals each installed with any application in the set of target applications to be pushed, wherein the device configuration parameter comprises at least one of an operation system, a type, a screen resolution and a memory size;
   determining a common device configuration parameter from the device configuration parameters of the terminals each installed with any application in the set of target applications to be pushed;
   determining the target configuration parameter at least required for the target terminal to install the target applications in the set of target applications to be pushed, according to the common device configuration parameter.

3. The method according to claim 1, further comprising:
   filtering the applications in the set of target applications to be pushed out from the set of applications to be pushed to acquire an application push subset, if it is determined that the device configuration parameter of the target terminal is not matched with the target configuration parameter;
   pushing applications in the application push subset to the target terminal.

4. The method according to claim 2, further comprising:
   filtering the applications in the set of target applications to be pushed out from the set of applications to be pushed to acquire an application push subset, if it is determined that the device configuration parameter of the target terminal is not matched with the target configuration parameter;
   pushing applications in the application push subset to the target terminal.

5. A service device, comprising a processor, a memory, an communication interface and a communication bus, wherein the memory is configured to store an executable program code, the processor is configured to run a program corresponding to the executable program code by reading the executable program code stored in the memory to perform:
   acquiring a set of target applications to be pushed, in which the target applications require a target terminal, to which the target applications are to be pushed, to at least have a target configuration parameter;
   acquiring a device configuration parameter of the target terminal; and
   determining whether the device configuration parameter of the target terminal is matched with the target configuration parameter, and pushing the target applications in the set of target applications to be pushed to the target terminal if the device configuration parameter of the target terminal is matched with the target configuration parameter;
   wherein acquiring a set of target applications to be pushed comprises:
      determining a set of applications to be pushed according to an application push rule;
      determining the set of target applications to be pushed from the set of applications to be pushed according to attribute information of each application in the set of applications to be pushed, the set of target applications to be pushed being a subset of the set of applications to be pushed;
      determining the target configuration parameter at least required for the target terminal to install the target applications in the set of target applications to be pushed, according to device configuration parameters of terminals each installed with any application in the set of target applications to be pushed;

wherein determining the set of target applications to be pushed from the set of applications to be pushed according to attribute information of each application in the set of applications to be pushed comprises:
  acquiring applications having an installation package size greater than a predetermined threshold from the set of applications to be pushed, the acquired applications constituting an application subset;
  acquiring a ratio of the number of terminals installed with the applications in the application subset to the number of terminals installed with the applications in the set of applications to be pushed;
  determining that the application subset is the set of target applications to be pushed if the ratio is smaller than a predetermined ratio.

6. The service device according to claim 5, wherein determining the target configuration parameter at least required for the target terminal to install the target application in the set of target applications to be pushed, according to device configuration parameters of terminals each installed with any application in the set of target applications to be pushed comprises:
  acquiring the device configuration parameters of the terminals each installed with any application in the set of target applications to be pushed, wherein the device configuration parameter comprises at least one of an operation system, a type, a screen resolution and a memory size;
  determining a common device configuration parameter from the device configuration parameters of the terminals each installed with any application in the set of target applications to be pushed;
  determining the target configuration parameter at least required for the target terminal to install the target applications in the set of target applications to be pushed, according to the common device configuration parameter.

7. The service device according to claim 5, further comprising:
  filtering the applications in the set of target applications to be pushed out from the set of applications to be pushed to acquire an application push subset, if it is determined that the device configuration parameter of the target terminal is not matched with the target configuration parameter;
  pushing applications in the application push subset to the target terminal.

8. A non-transitory computer readable storage medium having stored therein instructions that, when executed by a processor of a device, causes the device to perform an application push method comprising:
  acquiring a set of target applications to be pushed, in which the target applications require a target terminal, to which the target applications are to be pushed, to at least have a target configuration parameter;
  acquiring a device configuration parameter of the target terminal; and
  determining whether the device configuration parameter of the target terminal is matched with the target configuration parameter, and pushing the target applications in the set of target applications to be pushed to the target terminal if the device configuration parameter of the target terminal is matched with the target configuration parameter;
wherein acquiring a set of target applications to be pushed comprises:
  determining a set of applications to be pushed according to an application push rule;
  determining the set of target applications to be pushed from the set of applications to be pushed according to attribute information of each application in the set of applications to be pushed, the set of target applications to be pushed being a subset of the set of applications to be pushed;
  determining the target configuration parameter at least required for the target terminal to install the target applications in the set of target applications to be pushed, according to device configuration parameters of terminals each installed with any application in the set of target applications to be pushed;
wherein determining the set of target applications to be pushed from the set of applications to be pushed according to attribute information of each application in the set of applications to be pushed comprises:
  acquiring applications having an installation package size greater than a predetermined threshold from the set of applications to be pushed, the acquired applications constituting an application subset;
  acquiring a ratio of the number of terminals installed with the applications in the application subset to the number of terminals installed with the applications in the set of applications to be pushed;
  determining that the application subset is the set of target applications to be pushed if the ratio is smaller than a predetermined ratio.

9. The non-transitory computer readable storage medium according to claim 8, wherein determining the target configuration parameter at least required for the target terminal to install the target application in the set of target applications to be pushed, according to device configuration parameters of terminals each installed with any application in the set of target applications to be pushed comprises:
  acquiring the device configuration parameters of the terminals each installed with any application in the set of target applications to be pushed, wherein the device configuration parameter comprises at least one of an operation system, a type, a screen resolution and a memory size;
  determining a common device configuration parameter from the device configuration parameters of the terminals each installed with any application in the set of target applications to be pushed;
  determining the target configuration parameter at least required for the target terminal to install the target applications in the set of target applications to be pushed, according to the common device configuration parameter.

10. The non-transitory computer readable storage medium according to claim 8, further comprising:
  filtering the applications in the set of target applications to be pushed out from the set of applications to be pushed to acquire an application push subset, if it is determined that the device configuration parameter of the target terminal is not matched with the target configuration parameter;
  pushing applications in the application push subset to the target terminal.

* * * * *